H. STINEMETTS.
TIRE RIM.
APPLICATION FILED JUNE 7, 1916.

1,223,635.

Patented Apr. 24, 1917.
2 SHEETS—SHEET 1.

Witnesses
Hugh H. Ott
F. Hough

Inventor
Henry Stinemetts
By Victor J. Evans
Attorney

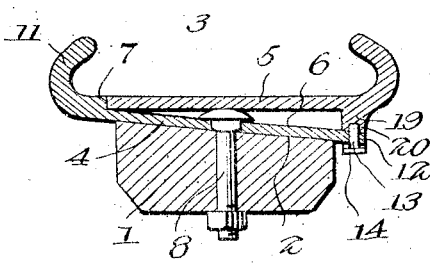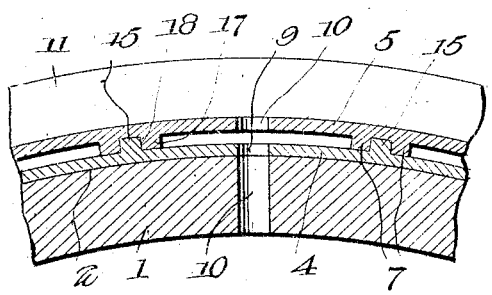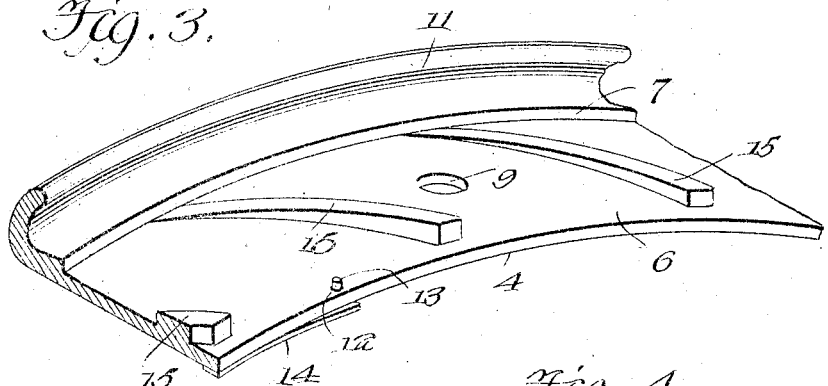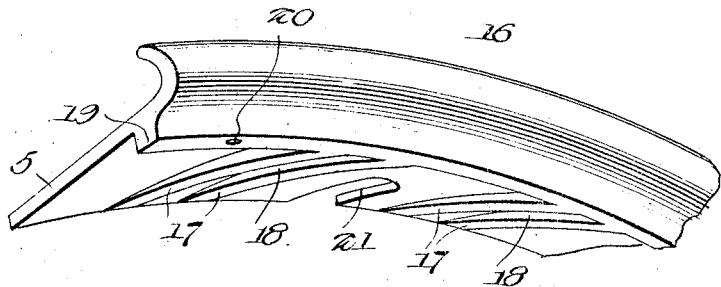

UNITED STATES PATENT OFFICE.

HENRY STINEMETTS, OF THE DALLES, OREGON.

TIRE-RIM.

1,223,635.  Specification of Letters Patent.  Patented Apr. 24, 1917.

Application filed June 7, 1916. Serial No. 102,265.

*To all whom it may concern:*

Be it known that I, HENRY STINEMETTS, a citizen of the United States, residing at The Dalles, in the county of Wasco and State of Oregon, have invented new and useful Improvements in Tire-Rims, of which the following is a specification.

This invention relates to a tire rim and particularly to that type of rim which is especially adapted for use upon the fellies of automobile wheels and similar vehicles.

The primary object of the invention is to provide a tire rim of this character having an outer section which is removably connected with an inner section fixed to the wheel felly thus enabling the tire to be easily and quickly connected with or disconnected from the wheel to which the rim is applied.

Another object of the invention is to provide the inner section of the rim which is fixedly connected with the felly with diagonally disposed and circumferentially arranged ribs on its outer face adapted to be received in grooves formed by similar ribs arranged in pairs on the inner face of the outer section thus preventing the sections from becoming separated through lateral movement when in tire clamping position.

A further object of the invention is to provide the sections of the tire rim with tapered lugs which co-act with an inclined portion on the inner section of the rim in causing the outer or removable section of the rim to be tightly wedged between the inner section and the tire when said rims are in tire clamping position.

A still further object of the invention is to provide the outer section of the rim with an upstanding flange which closes a space formed by the tapered ribs on said sections and is engaged by latch members on the inner section of the rim to prevent turning movement of the outer section of the rim when said sections are in tire clamping position.

With these and other objects in view, the invention resides in the novel combination and arrangement of parts which will be hereinafter described and particularly pointed out in the claims.

The preferred embodiment of the invention has been illustrated in the accompanying drawing although no restriction is necessarily made to the precise details of construction therein shown, as changes, alterations, and modifications within the scope of the claims may be resorted to when desired.

Like characters of reference denote corresponding parts throughout the several views in the drawing, in which:

Fig. 2 is a transverse sectional view through the felly and rim and showing the same upon an enlarged scale.

Fig. 3 is a perspective view of a portion of the inner section of the tire clamping rim.

Fig. 4 is a similar view of a portion of the outer section of the tire clamping rim.

Figure 1:
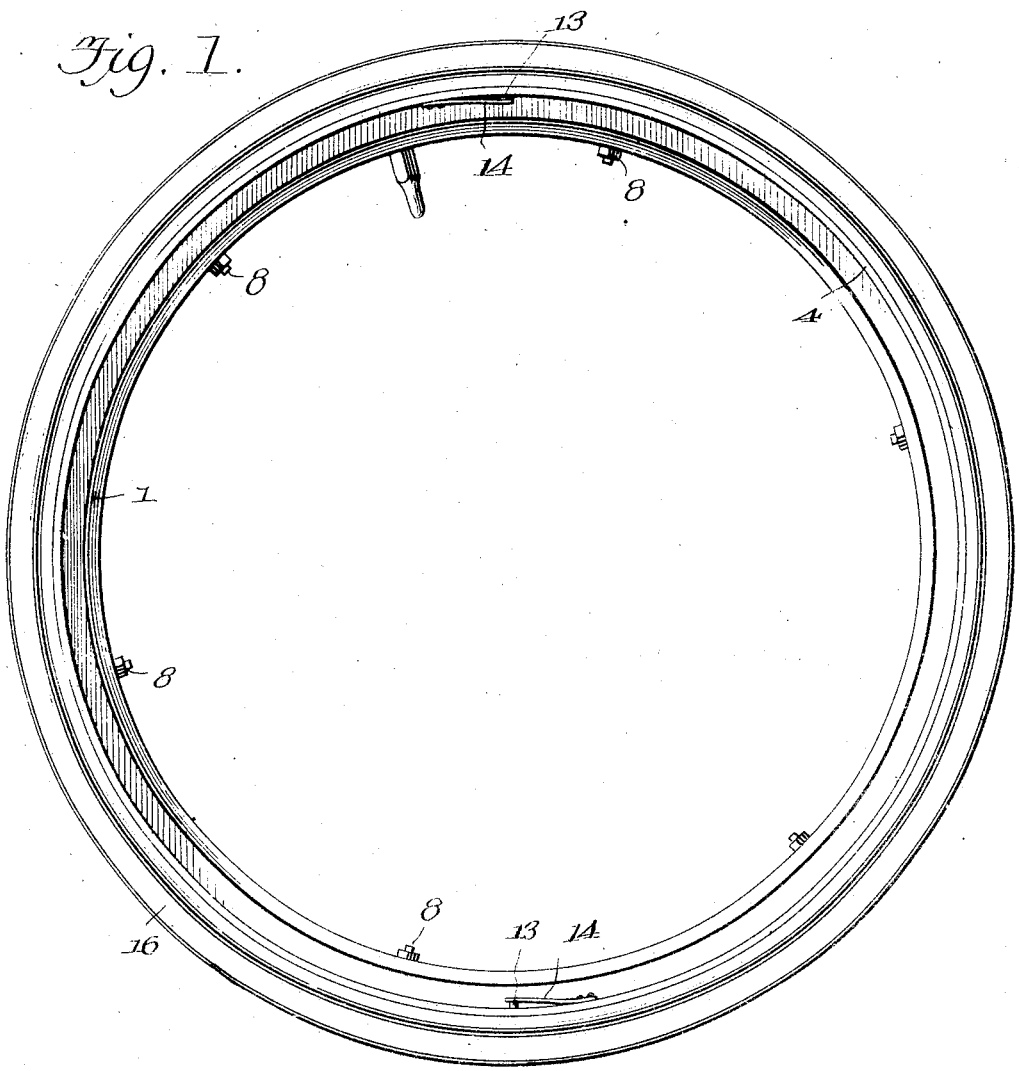
Figure 1 is a face view of a felly showing the improved tire clamping rim connected therewith.
Figure 5:
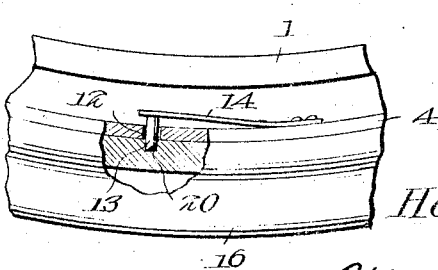
Fig. 5 is a detail view partly in section of a portion of the felly and tire clamping rim showing the manner of locking the outer rim section against turning movement.

Referring now to the drawing in detail, the numeral 1 designates the felly of an automobile wheel of the type now in common use and having a beveled outer face 2.

The improved tire clamping rim is designated in the drawing by the numeral 3 and comprises an inner section 4 and an outer section 5.

The inner section 4 is provided for the greater portion of its width with an inclined and reduced portion 6 forming between the marginal edges of said section on the outer face thereof a continuous shoulder 7.

The inner face of the inclined portion 6 of the inner section 4 is adapted to be brought into contact with the beveled face on the felly 1. said section being connected with the felly by means of bolts 8 and has formed therein an opening 9 registering with a similar opening 10 in the felly 1 and through which may be passed the valve stem on the tire.

One marginal edge of the inner section 4 is provided with a curved flange forming a continuous tire clamping bead 11. The inclined portion 6 of the inner section 4 has formed therein at diametrically opposite points adjacent the other marginal edge of the rim openings 12 in each of which is arranged a locking pin 13 having a length greater than the thickness of the reduced and inclined portion of said section. Leaf springs 14 have one end connected with one end of a pin 13 and its other end secured to the inner face of the inclined portion 6 of the inner section, so that said pins for a portion of their length extend below the outer face of the inclined portion on the inner section.

Arranged circumferentially about the outer face of the reduced portion 6 of the inner section 4 are spaced ribs 15 which extend diagonally and transversely of said portion between one marginal edge thereof and the shoulder 7, said ribs gradually decreasing in height from the marginal edge toward the shoulder 7.

The outer section 5 of the tire rim has formed thereon at one marginal edge a curved flange forming a continuous tire clamping bead 16, the other marginal edge of said section being adapted for contact with the shoulder 7 when the sections are in tire clamping position.

The inner face of the outer section 5 is provided with diagonally and transversely disposed ribs 17 arranged in pairs circumferentially about the tire to provide between each pair of ribs a groove 18 adapted to receive a rib 15 on the inner section of the tire rim, said ribs 17 gradually increasing in height from the marginal edge of the section adapted for contact with the shoulder 7 toward the bead 16.

The bead 16 on the outer section 5 merges into an upstanding flange 19 on the inner face of the outer section 5, said flange being arranged at the larger ends of the ribs 17 and forms a shoulder with which the larger ends of the ribs 15 on the inner section of the tire are adapted to contact when the sections are in tire clamping position.

The flange 19 has formed therein at diametrically opposite points openings 20 which serve as sockets to receive the projecting portions of the pins 13 when the sections are in tire clamping position thus locking the outer section against turning movement and also enabling the flange 19 to close the space between the inner and outer sections at the large end of the ribs thereon.

By forming the inner section of the tire clamping rim with an inclined portion and tapering the ribs on said sections, the outer section of the rim is caused to be tightly wedged between the tire and the inner section of the rim when the outer rim section has been turned to tire clamping position, thus securely engaging the rim with the tire and also exerting a slight binding action between the rim sections to prevent undue strain being imposed on the pins 13.

The outer section 5 has formed therein in its reduced portion an elongated recess 21 opening out at one end through the marginal edge of said section which is adapted for contact with the shoulder 7 and with the side walls of the recess running parallel with the adjacent ribs 17 to enable the outer section to be connected with the inner section without injuring the valve stem passing through the inner section and the felly 1.

When it is desired to use the rim in connection with a felly as shown in the drawing, the inner section of the tire rim is secured thereto in the manner described and the valve stem passed through the opening in the felly and section 4.

The bead on the tire is positioned in the tire clamping bead 11 and one marginal edge of the outer section 5 disposed between the other bead on the tire with the grooves 18 formed by the ribs 17 in a position to receive the larger ends of the ribs 15.

The outer section 5 is now turned to cause the ribs 15 to pass through the groove 18 and when this has been accomplished the bead 16 will be brought into contact with the bead on the tire and the extending portions of the pins 13 on the section 4 received in the sockets in the flange 19, so that the outer section is locked against turning movement, while the ribs on said sections hold the outer section against lateral movement and in tire clamping position with the flange 19 excluding foreign matter from the spaces between the ribs on said sections.

It will also be noted that the stop shoulder 7 on the section 4 limits the inward movement of the outer section so that the sockets in the flange 19 will always be caused to register with the extending portions of the pins 13 when the sections are moved to tire clamping position.

When it is desired to remove the tire from the wheel, the springs connected with the locking pins are moved to a position to retract the portions of the pins from the sockets 20 and the outer section of the rim turned to disengage the ribs 15 from the grooves 18 formed by the ribs 17 at which time the tire may be disengaged from the bead 11 on the inner section 4.

From the above description, taken in connection with the accompanying drawing, it is at once apparent that a tire clamping rim has been provided which is simple in construction, inexpensive of manufacture, yet highly efficient in use.

Having thus described the invention, what is claimed as new, is:

1. In combination, a felly having a beveled outer face, a rim having an inner section connected with said face, tapered ribs on the inner rim section, an outer rim section for connection with the inner rim section, and tapered ribs on the outer rim section arranged in pairs to provide grooves to receive the ribs on the inner rim section.

2. In combination, a felly having a beveled outer face, a rim having an inner section provided with a reduced and inclined portion connected with said face, tapered ribs on the outer face of said inclined portion extending transversely and diagonally thereof, an outer rim section for connection with the inner rim section, and diagonally arranged and transversely extending tapered ribs arranged in pairs on the inner face of the outer rim section to receive therebetween the ribs on the inner rim section.

3. In combination, a felly having a beveled outer face, a rim having an inner section connected with said face, diagonally disposed and transversely extending tapered ribs on the outer face of the inner section, an outer rim section for connection with the inner rim section, diagonally disposed and transversely extending tapered ribs arranged in pairs on the inner face of the outer rim section to receive therebetween the ribs on the outer face of the inner rim section, a flange on the outer rim section having openings therein, and spring pressed pins carried by the inner rim section and having portions thereof adapted to be received in said openings.

In testimony whereof I affix my signature.

HENRY STINEMETTS.